United States Patent
Harmon et al.

(10) Patent No.: US 7,155,922 B2
(45) Date of Patent: Jan. 2, 2007

(54) ENERGY EFFICIENT HEAT PUMP SYSTEMS FOR WATER HEATING AND AIR CONDITIONING

(75) Inventors: Steve Harmon, Adamstown (AU); Ying You, Adamstown (AU)

(73) Assignee: Quantum Energy Technologies Pty Limited, Adamstown (AU)

( * ) Notice: Subject to any disclaimer, the term of this patent is extended or adjusted under 35 U.S.C. 154(b) by 183 days.

(21) Appl. No.: 10/498,397

(22) PCT Filed: Dec. 12, 2002

(86) PCT No.: PCT/AU02/01683

§ 371 (c)(1),
(2), (4) Date: Dec. 21, 2004

(87) PCT Pub. No.: WO03/050457

PCT Pub. Date: Jun. 19, 2003

(65) Prior Publication Data

US 2005/0109490 A1    May 26, 2005

(30) Foreign Application Priority Data

Dec. 12, 2001  (AU) .................................... PR9453

(51) Int. Cl.
*F25B 27/00*    (2006.01)
(52) U.S. Cl. .................................... 62/238.7; 237/2 B
(58) Field of Classification Search ............. 62/160, 62/180, 183, 196.4, 238.6, 238.7, 324.1, 62/324.6; 237/2 B, 8 A
See application file for complete search history.

(56) References Cited

U.S. PATENT DOCUMENTS

| | | | | |
|---|---|---|---|---|
| 4,232,529 A | * | 11/1980 | Babbitt et al. | 62/160 |
| 4,238,931 A | * | 12/1980 | Campbell | 62/183 |
| 4,299,098 A | | 11/1981 | Derosier | |
| 4,474,018 A | * | 10/1984 | Teagan | 62/79 |
| 4,592,206 A | * | 6/1986 | Yamazaki et al. | 62/160 |
| 4,665,712 A | * | 5/1987 | Gehring et al. | 62/325 |
| 4,680,941 A | * | 7/1987 | Richardson et al. | 62/184 |

(Continued)

FOREIGN PATENT DOCUMENTS

AU    A-17803/97    10/1997

(Continued)

*Primary Examiner*—Mohammad M. Ali
(74) *Attorney, Agent, or Firm*—The Webb Law Firm

(57) ABSTRACT

A heat pump system for providing water heating and air conditioning, comprising one or more compressors for circulating a refrigerant in the system, a hot water tank having a heat exchanger for heating and storing the hot water, an outdoor heat exchanger and a fan for rejecting or extracting heat to or from the outdoor environment in air cooling, or water heating and/or air heating modes of operation respectively, an indoor heat exchanger with a fan for conditioning and supplying air to an indoor space. The system is particularly suitable in applications which require water heating and house cooling all year round. The system may also be adapted to other situations such as year-round water heating with seasonal air cooling, or year-round water heating with seasonal air cooling and heating, etc., and used for different applications, e.g., space heating and cooling simultaneously.

19 Claims, 1 Drawing Sheet

U.S. PATENT DOCUMENTS

| | | |
|---|---|---|
| 4,727,727 A | 3/1988 | Reedy |
| 4,766,734 A | 8/1988 | Dudley |
| 4,856,578 A * | 8/1989 | McCahill .................... 165/241 |
| 4,893,476 A | 1/1990 | Bos et al. |
| 4,955,207 A * | 9/1990 | Mink ........................ 62/238.6 |
| 5,050,394 A | 9/1991 | Dudley et al. |
| 5,239,838 A * | 8/1993 | Tressler .................... 62/324.1 |
| 5,243,825 A | 9/1993 | Lin |
| 5,351,502 A | 10/1994 | Gilles et al. |
| 5,628,200 A | 5/1997 | Pendergrass |
| 5,772,113 A * | 6/1998 | Gerstmann et al. ......... 237/8 R |
| 6,467,288 B1 * | 10/2002 | Kuroki et al. ................ 62/197 |

FOREIGN PATENT DOCUMENTS

| | | |
|---|---|---|
| EP | 0 138 568 A2 | 4/1985 |
| GB | 2 168 136 A | 6/1986 |
| JP | 09-264630 A | 7/1997 |
| JP | 10-132419 A | 5/1998 |
| JP | 10-288420 A | 10/1998 |
| JP | 11-063661 A | 3/1999 |
| JP | 11-237086 A * | 8/1999 |
| JP | 2000-283599 A | 10/2000 |
| JP | 2001-165526 A | 6/2001 |
| JP | 2001-235248 A | 8/2001 |
| JP | 2001-235252 A | 8/2001 |
| JP | 2001-263856 A | 9/2001 |

* cited by examiner

ENERGY EFFICIENT HEAT PUMP SYSTEMS FOR WATER HEATING AND AIR CONDITIONING

BACKGROUND OF THE INVENTION

1. Field of the Invention

This invention relates to heat pump systems, and is particularly concerned with energy efficient heat pump systems for providing year-round water heating with year-round air cooling, or with seasonal air cooling, or with seasonal air cooling and heating.

2. Description of the Related Art

Any discussion of the prior art throughout the specification should in no way be considered as an admission that such prior art is widely known or forms part of common general knowledge in the field.

U.S. Pat. No. 4,766,734 describes a heat pump system for air conditioning, comfort zone heating, and water heating. Based on this system, U.S. Pat. No. 5,050,394 describes an improved heat pump system for air conditioning and water heating. Conventionally, the heat pump for air conditioning and water heating consists of a compressor for circulating a refrigerant in the system, a hot water heat exchanger for heating water, an indoor heat exchanger for conditioning and supplying air to the space to be conditioned, and an outdoor heat exchanger having an outdoor fan for dissipating or extracting heat to or from the outdoor ambient. The novel aspect of the system disclosed in U.S. Pat. No. 5,050,394 is that it also includes a means for controlling the compressor speed in accordance with the cooling load. In conventional systems, the refrigerant exhaust from the compressor enters the hot water heat exchanger first and then passes to the outdoor heat exchanger. It is stated in U.S. Pat. No. 5,050,394 that such a system may be operated in a full condensing mode in which the outdoor fan is switched off and most of the heat released from the refrigerant is used for water heating, and in a desuperheating mode in which the outdoor fan is turned on so that most of the heat released from the refrigerant is transferred by the outdoor heat exchanger to the outdoor air. However, one of the problems of such a system is that in the assumed desuperheating mode, partial condensing may occur in the hot water heat exchanger. That means the condenser temperature of the system will be raised to an unnecessarily high level (higher than the temperature of the hot water) which makes the system work in an inefficient way. On the other hand, more heat than that required to maintain the temperature of the water may be continuously transferred to the water which makes the water hotter than the set value, and the higher the water temperature, the higher the temperature of the compressor which is detrimental to the compressor. It is therefore desirable to overcome the above-mentioned problem and make the heat pump systems for water heating and air conditioning operate in a more energy efficient and reliable manner.

It is also desirable to provide heat pump systems for water heating and air conditioning which can be adjusted to meet different heating and cooling loads both economically and with little impact on each other. That is, when the heating load changes, the system should be able to be adjusted correspondingly with little impact on the cooling side, and when the cooling load changes, the system should be able to be adjusted correspondingly with little impact on the heating side.

It is further desirable to provide energy efficient heat pump systems for water heating and air conditioning which can be adjusted to work in different demanded modes such as year-round water heating and air cooling, year-round water heating and seasonal air cooling, year-round water heating and seasonal air cooling and heating.

It is an object of the present invention to overcome or ameliorate at least one of the disadvantages of the prior art, or to provide a useful alternative.

SUMMARY OF THE INVENTION

The invention provides a heat pump system for water heating and air conditioning, said system comprising:
   a compressor for circulating a refrigerant fluid through said system,
   a water tank for storing water,
   a first heat exchanger for heating water in said water tank,
   a second heat exchanger for rejecting or extracting heat to or from an outdoor environment,
   a third heat exchanger and associated fan for conditioning and supplying air to an indoor space;
   wherein said system is adapted such that when heating water stored in the water tank requires heating, the refrigerant fluid exhausted from the compressor passes through the first heat exchanger to transfer heat to the water in the water tank and subsequently passes through the second heat exchanger and, after the water in the water tank is heated to a predetermined temperature, the refrigerant fluid exhausted from the compressor bypasses the first heat exchanger and is directly passed to the second heat exchanger to exhaust heat to the outdoor environment.

Preferably, the predetermined temperature is in the range of 60° C. to 65° C.

Preferably, the second heat exchanger has an associated fan for rejecting or extracting heat to or from said outdoor environment, said fan being activated when the temperature of the refrigerant exiting the second heat exchanger is higher than that of the outdoor environment by a predetermined amount.

Preferably, the speed of operation of the fan associated with the second heat exchanger is variable in direct proportion to the amplitude of the temperature difference between the refrigerant exiting the second heat exchanger and the outdoor environment.

Preferably, the speed of operation of the fan associated with the third heat exchanger is variable depending upon cooling load.

Preferably, the speed of operation of the compressor is variable depending upon cooling load.

Preferably, the second heat exchanger is a finned coil type.

Preferably, the third heat exchanger is a finned coil type.

Preferably, a signal to control the path of the refrigerant fluid exhausted from the compressor is provided by a controller in response to a signal from a sensor measuring the temperature of the water.

Preferably, a signal to control the speed of the fan associated with the second heat exchanger is provided by a controller in response to a signal from temperature sensors measuring the temperature of the refrigerant exiting the second heat exchanger and the outdoor environment.

According to one aspect of the invention, when the water in the water tank needs to be heated, high-temperature refrigerant vapour exhausted from the compressor first enters the first heat exchanger to heat the water while the refrigerant vapour is cooled to liquid or subcooled liquid state, and then subsequently passes to the second heat exchanger to be cooled further. Once the water in the water tank is heated to a preset temperature, the refrigerant vapour exhausted from the compressor is passed directly to the second heat exchanger to exhaust the heat to the ambient air. In this way, a lower condenser temperature can be achieved.

According to another aspect of the invention, the fan associated with the second heat exchanger is turned on when the temperature of the refrigerant exiting the second heat exchanger exceeds that of the ambient air by a predetermined amount, with the speed of the fan preferably being variable in direct proportion to the amplitude of the temperature difference. In this way, the refrigerant can be cooled to a relatively constant temperature and no matter how the heating load varies, there will be little impact to the cooling side of the system. Preferably the fan associated with the third heat exchanger and/or compressor also operate at variable speeds corresponding to the cooling load, eg., the difference between the indoor thermostat setpoint and the temperature of the space being conditioned.

Advantageously, the system is particularly suitable in applications which require water heating and house cooling all year round. The system may also be adapted to other situations such as year-round water heating with seasonal air cooling, or year-round water heating with seasonal air cooling and heating, etc., and used for different applications, eg., space heating and cooling simultaneously.

According to another aspect of the invention, there are two ways for the refrigerant to go upon being exhausted from the compressor. When the water needs to be heated, the refrigerant exhausted from the compressor first enters the first heat exchanger to heat the water, and then passes to the second heat exchanger to be cooled further. Once the temperature of the water reaches a predetermined temperature, the refrigerant exhausted from the compressor is bypassed/diverted to the second heat exchanger directly, with the path of the refrigerant being controlled by a control unit and one or more associated valves. Preferably the predetermined temperature is within the range of 60° C. to 65° C. Since the temperature of the outdoor environment is significantly lower than that of the hot water a low condenser temperature can be achieved. For a given evaporator temperature, the lower the condenser temperature the greater the operating efficiency of the system. Therefore, this arrangement provides an energy efficient working mode. If the second (outdoor) heat exchanger is a coil, the fan associated with the heat exchanger is turned on when the temperature of the refrigerant exiting the coil exceeds that of the ambient air by a predetermined amount.

According to another aspect of the invention, the speed of operation of the fan associated with the second heat exchanger is preferably variable in direct proportion to the magnitude of the temperature difference between the refrigerant exiting the second heat exchanger and the ambient air. In this way, the refrigerant is almost cooled down in the same magnitude with an economic fan power consumption. In comparison to the water being heated, the temperature of the outdoor air changes little, so the temperature of the refrigerant cooled changes little, and even though the water heating load changes (with the condenser temperature) there is little impact on the cooling side.

The signal to control the path of the refrigerant exhausted from the compressor may be provided by the controller according to a signal from a thermal sensor or thermostat of the water or the tank wall.

The signal to control the speed of the fan associated with the second heat exchanger may be provided by the controller according to the signals of the temperature sensors of the refrigerant exiting the second heat exchanger and of the ambient air. Experimental testing shows that the temperature of the refrigerant exhausted from the water heater exceeds the temperature of the ambient air within a relatively short time frame (typically a couple of minutes after the system is started). When the temperature difference is larger than a certain predetermined value, the fan associated with the second heat exchanger starts running. The greater the temperature difference, the faster the fan operates.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

BRIEF DESCRIPTION OF THE DRAWING

A preferred embodiment of the invention will now be described, by way of example only, with reference to FIG. 1 which is a schematic diagram of a heat pump system in accordance with the invention.

Figure 1:
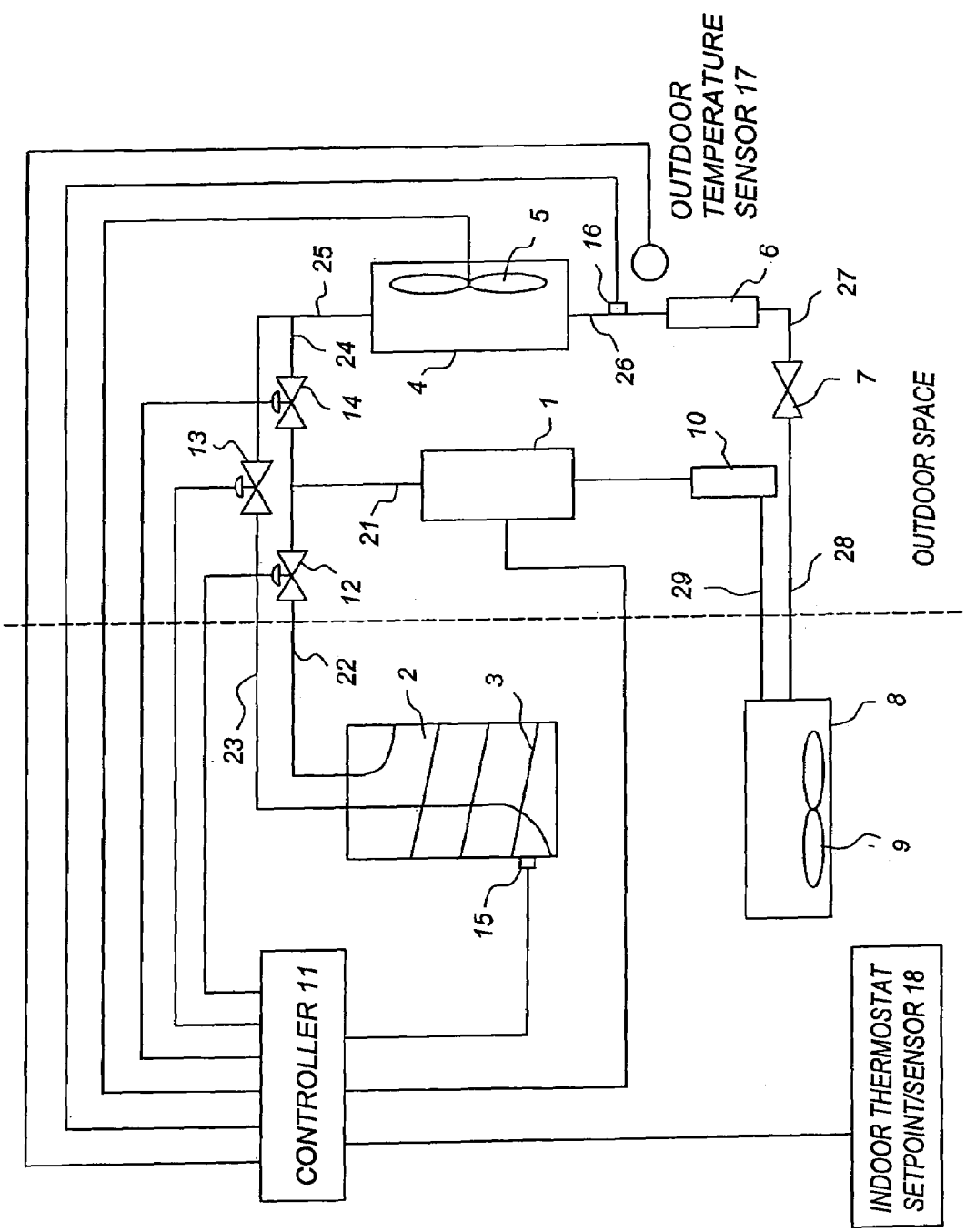

DESCRIPTION OF THE PREFERRED
EMBODIMENT OF THE INVENTION

A preferred embodiment of the heat pump system according to the present invention is depicted in FIG. 1 and comprises a compressor 1, a hot water tank 2, a heat exchanger 3 to heat the water (water heat exchanger) connected to the compressor 1 by pipeline 21, 22 and valve 12 in the pipeline 22, an outdoor heat exchanger 4 connected to the water heat exchanger 3 by pipeline 23 and a valve in the pipeline and pipeline 25, and also connected to the compressor 1 by pipeline 24 and valve 14 in the pipeline and pipeline 25, a filter/drier/accumulator 6 connected to the outdoor heat exchanger 4 by pipeline 26, an indoor heat exchanger 8 connected to the filter/drier/accumulator 6 by pipeline 27, expansion means 7, and the pipeline 28, and to the compressor 1 by pipeline 29 and maybe a suction filter/receiver 10 in the pipeline to complete the circuit.

The outdoor heat exchanger 4 is preferably of a finned coil type and has a fan 5 associated with it for blowing or drawing air across the finned coil if air is used as the heat source or heat sink. The operating speed of the fan 5 is variable in response to signals from the controller 11. It should be noted that whilst the outdoor heat exchanger 4 is typically located outdoor, it may also be located in an indoor space but it should not exhaust thermal energy (heat or cold air) to the same space conditioned by the so-called 'indoor heat exchanger', or to the space where the warm or cool air from the heat exchanger is objectionable.

Preferably the indoor heat exchanger 8 is also of a finned coil type having a fan for blowing or drawing air across the finned coil. Examples of fan-forced finned coil heat exchangers which may be used in the present invention are described in Australian Patent Application No. PN9202 filed on 10 Apr., 1996 and Australian Complete Patent Application No. 17803/97 filed on 9 Apr., 1997, the contents of which are incorporated herein by reference.

The compressor 1 may be driven by electric power. In use, the compressor 1 is arranged to circulate a refrigerant fluid in the heat pump system. The compressor withdraws refrigerant from the indoor heat exchanger 8 (or from a filter/receiver 10) via pipeline 29. Upon passing through the compressor 1 the refrigerant fluid follows the following path. When water in the tank 2 requires heating, the high-temperature refrigerant vapour exhausted from the compressor 1 enters the water heat exchanger 3 first via pipeline 21 and 22 to heat the water and in doing so the refrigerant vapour is cooled to liquid or subcooled liquid state. The refrigerant fluid then passes to the outdoor heat exchanger 4 via pipeline 23 and 25 to be cooled further (valve 12 and 13 open, valve 14 closed). After the water is heated to the preset value (eg. 60° C.), the water heat exchanger is isolated by closing valves 12 and 13 and the refrigerant vapour exhausted from the compressor 1 is passed directly to the outdoor heat exchanger 4 via pipeline 21, 24, 25 to exhaust heat to the outdoor environment (valves 12 and 13 closed, valve 14 open). Since the temperature of the outdoor environment (eg. water or air) is much lower than that of the hot water, the refrigerant coming from the water heat exchanger 3 can be cooled further, and when the water is heated, the refrigerant is cooled by the lower temperature outdoor environment directly, so a low condenser temperature can be achieved. For the same evaporator temperature, the lower the condenser temperature, the higher the efficiency of the system. Therefore, this arrangement results in a energy efficient mode. The operation of the valves 12, 13, 14 is controlled by controller 11 connected to the thermal sensor or thermostat 14 for sensing the temperature of the water or the tank wall.

If the outdoor heat exchanger 4 is a coil, the associated outdoor fan 5 is turned on when the temperature of the refrigerant exiting the coil 4 exceeds that of the ambient air by a predetermined amount, and the speed of outdoor fan 5 is preferably variable in direct proportion to the amplitude of the temperature difference, ie. the larger the temperature difference, the faster the fan runs. The operation of the outdoor fan 5 is controlled by controller 11 in response to the signals sensed by the refrigerant temperature sensor 16 and the outdoor temperature sensor 17. In this way, the refrigerant is almost cooled down in the same magnitude with an economic fan power consumption. In comparison to the water being heated, the temperature of the outdoor environment varies little, so the temperature of the refrigerant cooled changes little, and even though the water heating load changes (with the condenser temperature), there is little impact on the cooling side of the system.

The cooled refrigerant liquid is then forced to expand by the expansion means 7, which may comprise a throttling restriction or an expansion valve or other means. After the expansion means 7, the pressure and temperature of the refrigerant drop. The temperature of the refrigerant is below the temperature of the heat source, eg, the indoor air to be conditioned and heat is transferred from the heat source (eg, indoor air) to the refrigerant in the indoor heat exchanger 8. The refrigerant is vaporised or even superheated as the air is cooled down. The fan 9 associated with the indoor heat exchanger forces the air go through the coil 8 with some velocity to enhance the heat transfer effect and blows the cooled air to further space to make the temperature distribution in the space to be conditioned evenly. Preferably, the compressor 1 is also configured to run at variable speeds with its operating speed being related to the cooling load; e.g., the difference between the indoor thermostat setpoint and the temperature of the space being conditioned.

The heat pump system of the present invention is particularly suitable for use in applications which require both daily hot water and air cooling year-round. The system may also be adapted to other situations such as year-round water heating with seasonal air cooling, or year-round water heating with seasonal air cooling and heating. The system may also be used to year-round water heating, and cooling and heating simultaneously. For example, in some buildings in winter the interior zones need cooling while the exterior zones need heating. By using the heat otherwise rejected to the outdoor ambient, the heating can be supplied. There are also other variations in using the system. For example, intake air from the outdoor may also be pre-cooled or pre-heated by the air exhausted from the conditioned space, and the air exhausted from the conditioned space or from the intake air/exhaust air heat exchanger may also be fed to the outdoor heat exchanger.

Although the invention has been described with reference to specific examples it will be appreciated by those skilled in the art that the invention may be embodied in many other forms.

The invention claimed is:

1. A heat pump system for water heating and air conditioning, said system comprising:
   a compressor for circulating a refrigerant fluid through said system;
   a water tank for storing water;
   a first heat exchanger for heating water in said water tank;
   a second heat exchanger for rejecting or extracting heat to or from an outdoor environment;
   a third heat exchanger and associated fan for conditioning and supplying air to an indoor space, wherein said system is adapted so that:
      when heating water stored in the water tank requires heating, the refrigerant fluid exhausted from the compressor passes through the first heat transfer heat to the water in the water tank and then passes trough the second heat exchanger; and
      after the water in the water tank is heated to a predetermined temperature, the refrigerant fluid exhausted from the compressor bypasses the first heat exchanger and is directly passed to the second heat exchanger to exhaust heat to the outdoor environment.

2. The heat pump system as claimed in claim 1, wherein said predetermined temperature is in the range of 60° C. to 65° C.

3. The heat pump system as claimed in claim 1, wherein said second heat exchanger has an associated fan for rejecting or extracting heat to or from said outdoor environment, said fan being activated when the temperature of the refrigerant exiting the second heat exchanger is higher than that of the outdoor environment by a predetermined amount.

4. The heat pump system as claimed in claim 3, wherein said second heat exchanger has an associated fan for rejecting or extracting heat to or from said outdoor environment, said fan being activated when the temperature of the refrigerant exiting the second heat exchanger is higher than that of the outdoor environment by a predetermined amount.

5. The heat pump system as claimed in claim 3, wherein the speed of operation of the fan associated with the second heat exchanger is variable in direct proportion to the amplitude of the temperature difference between the refrigerant exiting the second heat exchanger and the outdoor environment.

6. The heat pump system as claimed in claim 4, wherein the speed of operation of the fan associated with the second heat exchanger is variable in direct proportion to the amplitude of the temperature difference between the refrigerant exiting the second heat exchanger and the outdoor environment.

7. The heat pump system as claimed in claim 1, wherein the speed of operation of the fan associated with the third heat exchanger is variable depending upon cooling load.

8. The heat pump system as claimed in claim 3, wherein the speed of operation of the fan associated with the third heat exchanger is variable depending upon cooling load.

9. The heat pump system as claimed in claim 1, wherein the speed of operation of the compressor is variable depending upon cooling load.

10. The heat pump system as claimed in claim 3, wherein the speed of operation of the compressor is variable depending upon cooling load.

11. The heat pump system as claimed in claim 1, wherein said second heat exchanger is a finned coil type.

12. The heat pump system as claimed in claim 3, wherein said second heat exchanger is a finned coil type.

13. The heat pump system as claimed in claim 1, wherein said third heat exchanger is a finned coil type.

14. The heat pump system as claimed in claim 3, wherein said third heat exchanger is a finned coil type.

15. The heat pump system as claimed in claim 1, wherein a signal to control the path of the refrigerant fluid exhausted from the compressor is provided by a controller in response to a signal from a sensor measuring the temperature of the water.

16. The heat pump system as claimed in claim 2, wherein a signal to control the path of the refrigerant fluid exhausted from the compressor is provided by a controller in response to a signal from a sensor measuring the temperature of the water.

17. The heat pump system as claimed in claim 4, wherein a signal to control the path of the refrigerant fluid exhausted from the compressor is provided by a controller in response to a signal from a sensor measuring the temperature of the water.

18. The heat pump system as claimed in claim 3, wherein a signal to control the speed of the fan associated with the second heat exchanger is provided by a controller in response to a signal from temperature sensors measuring the temperature of the refrigerant exiting the second heat exchanger and the outdoor environment.

19. The heat pump system as claimed in claim 15, wherein a signal to control the speed of the fan associated with the second heat exchanger is provided by a controller in response to a signal from temperature sensors measuring the temperature of the refrigerant exiting the second heat exchanger and the outdoor environment.

* * * * *

UNITED STATES PATENT AND TRADEMARK OFFICE
CERTIFICATE OF CORRECTION

| | | |
|---|---|---|
| PATENT NO. | : 7,155,922 B2 | Page 1 of 1 |
| APPLICATION NO. | : 10/498397 | |
| DATED | : January 2, 2007 | |
| INVENTOR(S) | : Harmon et al. | |

It is certified that error appears in the above-identified patent and that said Letters Patent is hereby corrected as shown below:

Column 6, Line 26, Claim 1, "the first heat transfer heat" should read
--the first heat exchanger to transfer heat--

Signed and Sealed this

Seventeenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,155,922 B2 Page 1 of 1
APPLICATION NO. : 10/498397
DATED : January 2, 2007
INVENTOR(S) : Harmon et al.

It is certified that error appears in the above-identified patent and that said Letters Patent is hereby corrected as shown below:

Column 6, Line 26, Claim 1, "the first heat transfer heat" should read
-- the first heat exchanger to transfer heat --

Signed and Sealed this

Twenty-first Day of April, 2009

JOHN DOLL
*Acting Director of the United States Patent and Trademark Office*